United States Patent [19]
Fulks et al.

[11] Patent Number: 5,522,486
[45] Date of Patent: Jun. 4, 1996

[54] DAMPING VALVE FOR SHOCK ABSORBER

[75] Inventors: Gary C. Fulks, Spring Valley, Ohio; Thierry Annequin, Paris, France

[73] Assignee: Delphi France Automotive Systems, Detroit, Mich.

[21] Appl. No.: 337,612

[22] Filed: Nov. 10, 1994

[30] Foreign Application Priority Data

Nov. 13, 1993 [GB] United Kingdom .................. 9323469
Jun. 9, 1994 [GB] United Kingdom .................. 9411581

[51] Int. Cl.⁶ ................................................ F16F 5/00
[52] U.S. Cl. ............... 188/315; 188/322.14; 188/322.15; 188/286
[58] Field of Search .................... 188/318, 315, 188/316, 322.14, 322.15, 322.19, 281, 282, 786

[56] References Cited

U.S. PATENT DOCUMENTS

| | | | |
|---|---|---|---|
| 3,194,262 | 7/1965 | Hamilton | 188/322.14 |
| 3,892,437 | 7/1975 | Makinen | 188/286 |
| 3,960,251 | 6/1976 | Gorissen | 188/286 |
| 4,310,077 | 1/1982 | Whiteside | 188/282 |
| 4,325,468 | 4/1982 | Siorek | 188/322.14 |
| 5,360,089 | 11/1994 | Nakamura | 188/322.15 |

FOREIGN PATENT DOCUMENTS

| | | |
|---|---|---|
| 908277 | 10/1962 | United Kingdom . |
| 1125104 | 8/1968 | United Kingdom . |
| 1484195 | 9/1977 | United Kingdom . |
| 2234041 | 1/1991 | United Kingdom . |

*Primary Examiner*—Robert J. Oberleitner
*Assistant Examiner*—C. T. Bartz
*Attorney, Agent, or Firm*—Jeffrey A. Sedlar

[57] ABSTRACT

A shock absorber comprising an outer tube; an inner tube positioned inside the outer tube; a rod guide closing one end of the inner tube and the outer tube; a compensation valve assembly closing the other end of the inner tube; the other end of the outer tube being closed; a piston assembly slidably sealably positioned inside the inner tube and dividing the inner tube into a rebound chamber and a compression chamber; a piston rod connected to the piston assembly and extending through the rebound chamber and the rod guide; a compensation chamber formed between the inner tube and the outer tube; and a damping valve covering an aperture through the inner tube from the compression chamber, the damping valve being actuable by differential pressure above a predetermined level to allow flow of fluid in one direction only from the compression chamber through the aperture to the compensation chamber. Improved damping characteristics at slow speed damping.

4 Claims, 4 Drawing Sheets

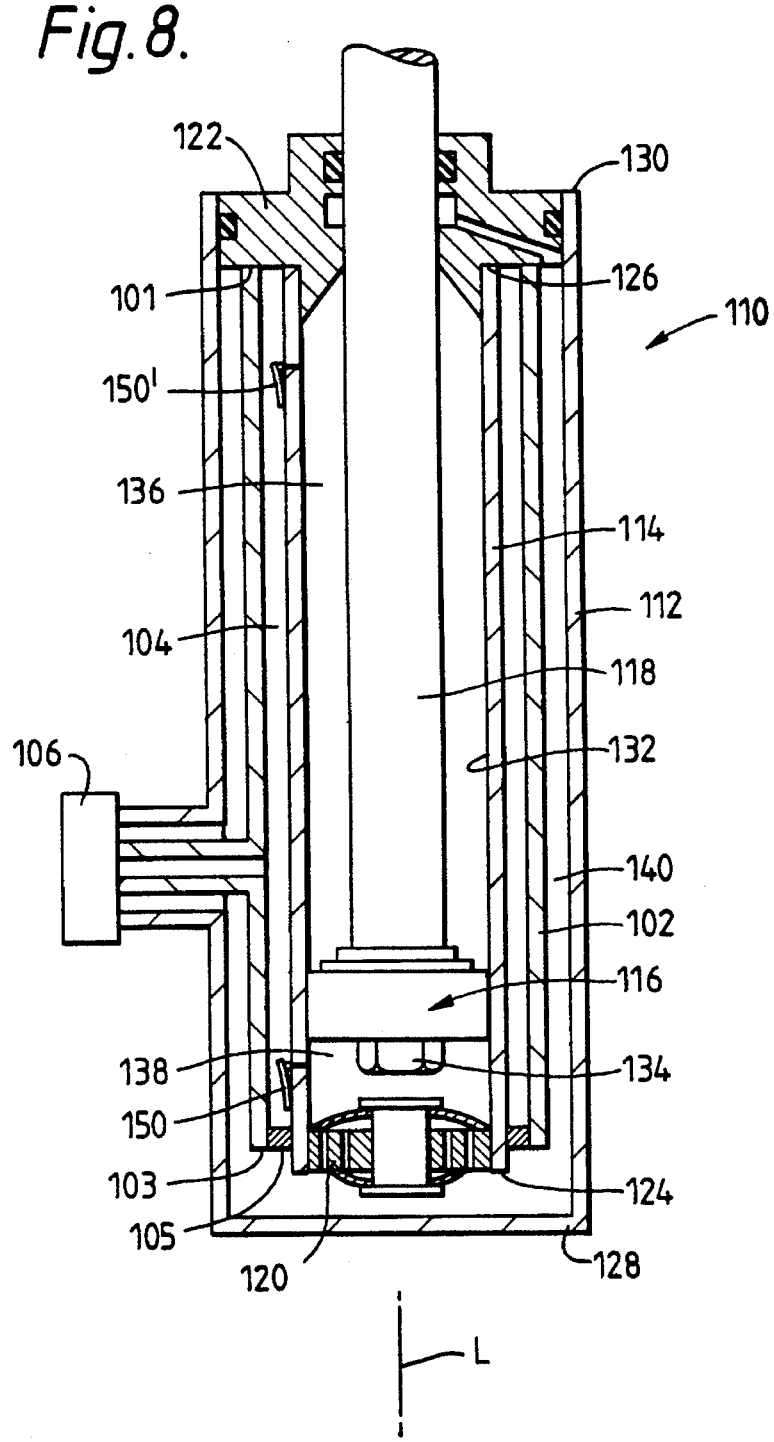

DAMPING VALVE FOR SHOCK ABSORBER

BACKGROUND OF THE INVENTION

The present invention relates to a shock absorber or hydraulic damper, and in particular to a shock absorber having a damping valve for controlling the flow of fluid between two fluid chambers in the shock absorber.

Known shock absorbers comprise an inner tube; an outer tube; a compensation chamber formed between the inner and outer tubes; a piston assembly sealably slidably mounted in the inner tube, the piston assembly separating a compression chamber from a rebound chamber within the inner tube; a rod guide positioned at one end of the inner and outer tubes; a piston rod connected to the piston assembly and extending through the rebound chamber and the rod guide; and a compensation valve assembly positioned at the other end of the inner tube. These known shock absorbers are commonly referred to as twin-tubed dampers. In these known arrangements, the piston assembly typically comprises a number of apertures normally closed by one of two valve elements (such as resilient discs). One valve element allows flow of fluid through some of the apertures from the rebound chamber to the compression chamber, and the other valve element allows flow of fluid through the remaining apertures during use of the shock absorber. Similarly the compensation valve assembly allows fluid flow between the compression chamber and the compensation chamber during use of the shock absorber. Bleed passages are also provided through the piston assembly and the compensation valve assembly to allow restricted flow of fluid during periods when the piston assembly is moving at a slow speed relative to the inner tube. This arrangement has the disadvantage that adjustment or setting of the damping characteristics of the suspension strut, especially at slow speeds is extremely difficult to control. Further, the apertures and bleed passages are susceptible to being easily blocked by dirt.

SUMMARY OF THE INVENTION

It is an aim of the present invention to overcome the above mentioned disadvantages.

To this end, a shock absorber in accordance with the present invention comprises an outer tube; an inner tube positioned inside the outer tube; a rod guide closing one end of the inner tube and the outer tube; a compensation valve assembly closing the other end of the inner tube; the other end of the outer tube being closed; a piston assembly slidably sealably positioned inside the inner tube and dividing the inner tube into a rebound chamber and a compression chamber; a piston rod connected to the piston assembly and extending through the rebound chamber and the rod guide; a compensation chamber formed between the inner tube and the outer tube; and a damping valve covering an aperture through the inner tube from the compression chamber, the damping valve being actuable by differential pressure above a predetermined level to allow flow of fluid in one direction only from the compression chamber through the aperture to the compensation chamber.

BRIEF DESCRIPTION OF THE DRAWINGS

The present invention will now be described, by way of example, with reference to the accompanying drawings, in which:

FIG. 8 is a cross-sectional view of another embodiment of shock absorber in accordance with the present invention; and FIG. 9 is an enlarged view of one of the damping valves of the shock absorber of FIG. 8.

DETAILED DESCRIPTION OF THE PRESSENTLY PREFERRED EMBODIMENT

Figure 1:
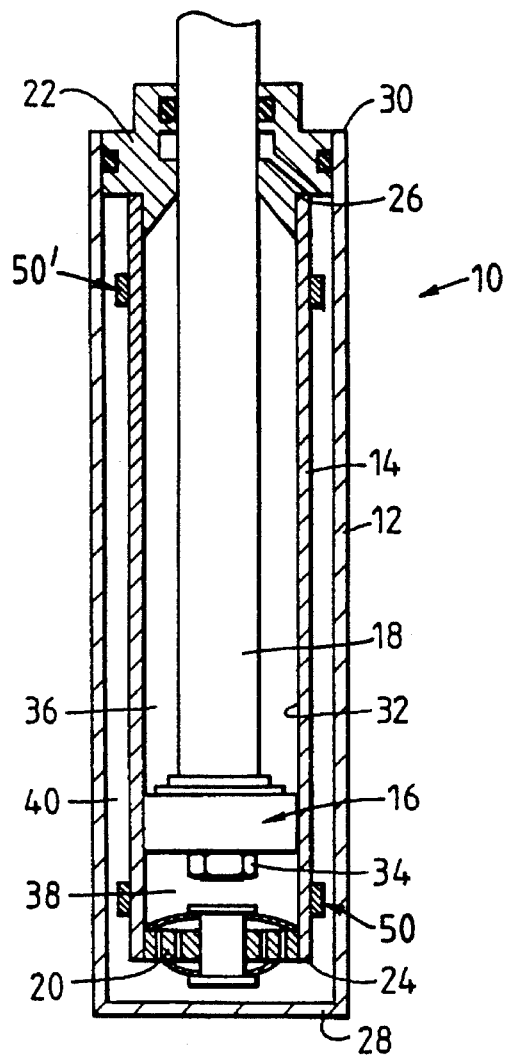
FIG. 1 is a cross-sectional view of a shock absorber in accordance with the present invention.

Referring to FIG. 1 of the drawings, the shock absorber 10 shown in FIG. 1 is of the twin tube damper type, and comprises an outer tube 12, an inner tube 14 substantially coaxial with the outer tube on an axis L, a piston assembly 16, a piston rod 18 having a longitudinal axis on axis L, a compensation valve assembly 20, and a rod guide 22. The piston assembly 16, the compensation valve assembly 20 and the rod guide 22 may be any suitable conventional design well known to those skilled in the art, and will not be described in detail. The inner tube 14 is substantially closed at one end 24 by the compensation valve assembly 20, and is substantially closed at the other end 26 by the rod guide 22. The outer tube 12 is closed at one end 28 by an integral formation of the outer tube walls, and is substantially closed at the other end 30 by the rod guide 22. The piston rod 18 extends through, and makes a sealing sliding fit with the rod guide 22. The piston assembly 16 makes a sealing sliding fit with the inner surface 32 of the inner tube 14. The piston rod 18 is secured to the piston assembly 16 by a nut 34 or any other suitable means. The piston assembly 16 divides the inner area of the inner tube 14 into a rebound chamber 36 and a compression chamber 38. The area between the inner tube 14 and the outer tube 12 defines a compensation chamber 40. The rebound and compression chambers 36 and 38 are substantially filled with fluid to damp reciprocating movement of the piston assembly 16 and piston rod 18 along axis L relative to the outer and inner tubes 12 and 14. The compensating chamber 40 is partly filled with fluid and acts as a reservoir for the fluid in the rebound and compression chambers 36 and 38. The shock absorber 10 is mounted in a motor vehicle (not shown) in the standard manner.

Figure 2:
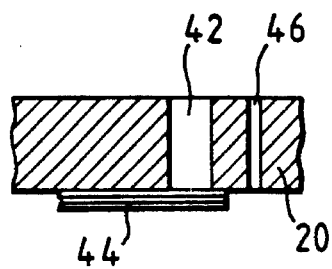
FIG. 2 is an enlarged cross-sectional partial view of the compensation valve assembly of the shock absorber of FIG. 1.

The compensation valve assembly 20, as shown in FIG. 2, comprises a number of apertures 42 which are closed at one end by a valve element in the form of flexible discs 44. The discs 44 and apertures 42 are provided on the compensation valve assembly to allow fluid flow from the compression chamber 38 to the compensation chamber 40 when the fluid pressure in the compression chamber exceeds a predetermined level. Other forms of valve element are known besides discs. In addition to the apertures 42, a bleed passage 46 is also provided for restricted flow of fluid during slow speed damping by the suspension strut. Similar fluid flow arrangements are provided on the other side of the compensation valve assembly 20 for fluid flow from the compensation chamber 40 to the compression chamber 38, and on both sides of the piston assembly 16 for fluid flow between the rebound chamber 36 and the compression chamber 38. The present invention is provided to either replace the bleed passage 46 or the enhance its effect, in combination with the valve elements already present, or to replace the combination of discs 44 and apertures 42 and the bleed passage 46.

Figure 3:
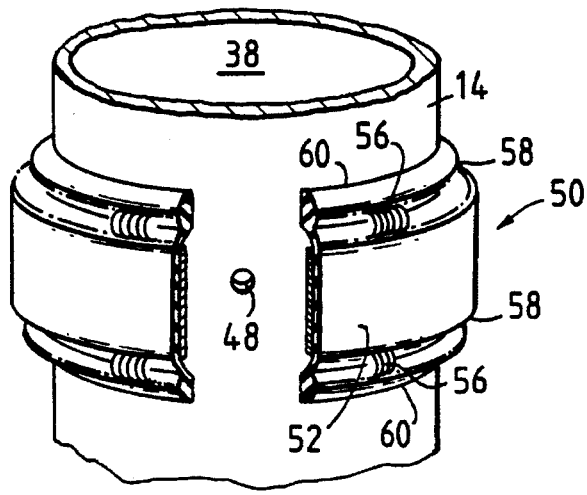
FIG. 3 is a partial perspective view of the inner tube and damping valve for the compression chamber of the shock absorber of FIG. 1 with a cut-away view of the damping valve.
Figure 4:
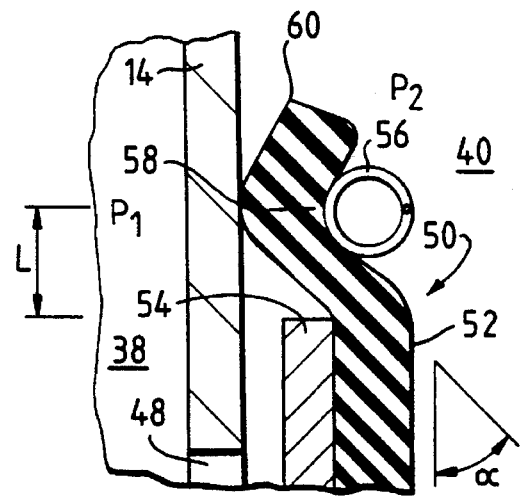
FIG. 4 is a partial cross-sectional view of the damping valve of FIG. 3 positioned on the inner tube.
Figure 5:
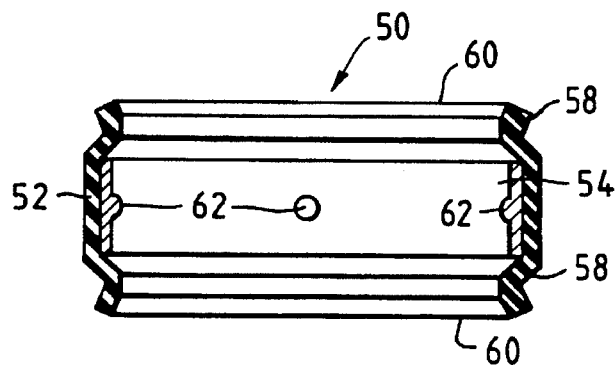
FIG. 5 is a cross-sectional view of the damping valve of FIG. 3 with the band springs omitted.

Referring to FIGS. 3 to 5, a damping valve 50 is provided to control restricted flow of fluid from the compression chamber 38 to the compensation chamber 40 by way of one or more apertures 48 in the inner tube 14. The damping valve 50 has an annular configuration and comprises a main body 52 of elastomeric or similar material, a reinforced band 54 of more resilient material positioned internally of, and substantially centrally in, the main body, and a pair of band springs 56. The band 54 is of a dimension relative to the main body 52 such that the main body overlies the band and defines a flexible portion 58 adjacent each circumferential edge 60 of the main body. Each band spring 56 is positioned around the outside of the main body in one of the flexible portions 58. The reinforced band 54 includes a number of inwardly directed pips 62 which engage the outer surface of the inner tube 14 and provide a clearance space between the reinforced band 54 and the inner tube 14. The damping valve 50 is positioned on the inner tube 14 to cover the apertures 48. The band springs 56 bias the flexible portions 58 of the main body 52 into contact with the outer surface of the inner tube 14.

Figure 6:
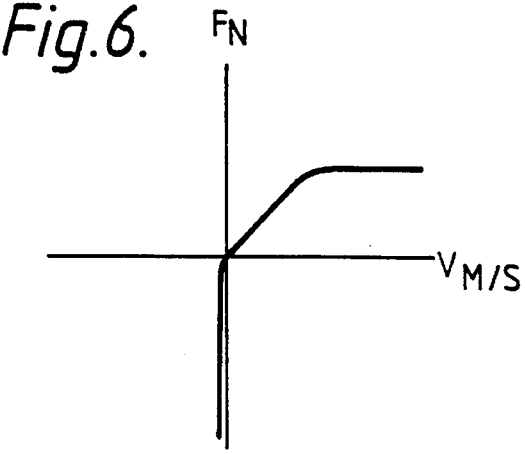
FIG. 6 is a graph of the force-velocity curve resulting from the use of the damping valve of FIG. 3.

In this embodiment, if the pressure $P_1$ of the hydraulic fluid in the compression chamber 38 is a predetermined amount greater than the pressure $P_2$ of the fluid in the compensation chamber 40 then the flexible portion 58 of the main body 52 will lift away from the outer surface of the inner tube 14 against the bias of the band springs 56, and fluid will flow from the compression chamber 38 to the compensation chamber 40 by way of apertures 48. If $P_2$ is greater than $P_1$, or the pressure differential is below the predetermined amount, then the flexible portions 58 of the main body 52 will seal against the outer surface of the inner tube 14 and flow of fluid through the apertures 48 will be prevented. Varying the spring rate or strength of the band spring 56 and/or the length L of the flexible portions 58 between the reinforced band 54 and the contact with the inner tube 14 and/or the angle $\alpha$ of the flexible portions 58 relative to the inner tube 14 will allow tuning of the damping effect of the damping valve 50, and hence provides an easy way of setting the damping effect of the shock absorber 10 especially for slow speed damping. The resultant force-velocity curve of the damping is shown in FIG. 6.

A similar damping valve 50' may also be positioned around the inner tube 14 to provide restricted fluid flow between the rebound chamber 36 and the compensation chamber 40 through one or more apertures in the inner tube 14 from the rebound chamber to the compensation chamber. The damping valve 50' can either enhance the effects of the valve element and apertures, and bleed passage (not shown) in the piston assembly 16 which allows fluid flow from the rebound chamber 36 to the compression chamber 38, or can replace them. The use of two such damping valves 50,50' in a suspension strut 10 will allow independent control of rebound and compression damping at slow speeds.

Figure 7:
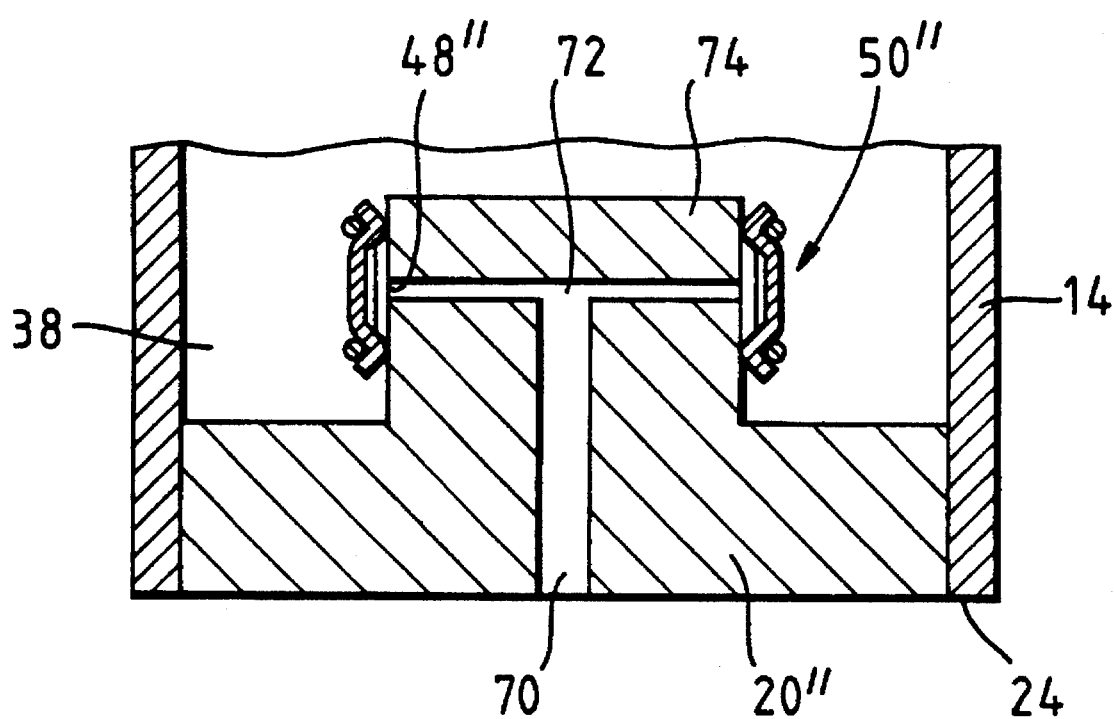
FIG. 7 is a cross-sectional view of a modified compensation valve assembly having a damping valve substantially as shown in FIGS. 3 to 5 mounted thereon.

A further modification to the shock absorber 10 of FIG. 1 is shown in FIG. 7. In this arrangement, the compensation valve assembly 20 of FIG. 1 is replaced by a compensation valve assembly 20" at the end 24 of the inner tube 14. The compensation valve assembly 20" has a stub portion 74 which is substantially cylindrical and which projects into the compression chamber 38. A longitudinally extending bore 70 connects with at least one diametrically extending bore 72 in the stub portion 74 to provide a fluid passage between the compression chamber 38 and the compensation chamber 40. The or each bore 72 opens through the stub portion 74 at apertures 48". damping valve 50" substantially as described above in relation to FIGS. 3 to 5 is mounted on the stub portion 74 to cover the apertures 48". Damping valve 50" controls the flow of fluid from the compensation chamber 40 to the compression chamber 38, and in combination with the damping valve 50 removes all need for valve elements and a bleed passage on the compensation valve assembly. A similar arrangement could be provided on the piston assembly 16 with a longitudinally extending bore passing through the piston into the piston rod 18 and connecting with one or more diametrically extending bores in the piston rod opening at apertures in the rebound chamber 36. A damping valve substantially the same as damping valve 50" would be mounted on the piston rod 18 to cover the apertures to control flow of fluid from the compression chamber 38 to the rebound chamber 36, and in combination with damping valve 50' would remove the need for valve elements and a bleed passage in the piston assembly. These modifications further help to finely adjust the damping characteristics of a shock absorber, especially at slow speeds.

Referring to FIGS. 8 and 9, this embodiment of shock absorber 110 is typically described as a semi-active hydraulic damper. An example of a semi-active damper is described in U.S. Pat. No. 5,163,538, the details of which are incorporated herein by reference. The features of the shock absorber 110 which are equivalent to the features of the shock absorber 10 described above have been given the same reference number but prefixed by 100. In comparison to the shock absorber 10 described above, an additional tube 102 is positioned between the inner tube 114 and the outer tube 112. The additional tube 102 is closed at one end 101 by the rod guide 122, and is integrally attached to the inner tube 114 at the other end 103 by an annular insert 105. A bypass channel 104 is defined by the gap between the inner tube 114 and the additional tube 102. The bypass channel 104 is substantially filled with hydraulic fluid and is fluidly connectable with the compensation chamber 140 by a solenoid actuated valve 106. The solenoid actuated valve 106 is actuated to control flow of fluid from the bypass channel 104 to the compensation chamber 140.

The damping valves 150,150' may be as shown in FIGS. 3 to 5. Preferably, however, each damping valve 150,150' is as shown in FIG. 9. In this case, the damping valve 150 comprises a resilient arm 180 which is secured at one end 182 to the outer surface of the inner tube 114, and a hemispherical ball 184 which is attached to the arm 180 at the other end 186 thereof and which normally closes the aperture 148 in the inner tube 114. The arm 180 is preferably of steel, and the one end 182 of the arm is preferably welded to the inner tube 114. The damping valve 150 opens the aperture 148 when the pressure differential between the compression chamber 138 and the bypass channel 104 exceeds a predetermined level in the same way as the damping valve 50 described above. The damping characteristics of the shock absorber 110 can be adjusted by varying the resilience of the arm 180 (by changing its length and/or thickness) and/or by changing the diameter of the aperture 148. The damping valve 150' is substantially identical to the damping valve 150. With the arrangement described herein with reference to FIGS. 8 and 9, the damping coefficients are such as to provide improved front to rear balance, making the vehicle more stable during slow speed damping.

The present invention has the additional advantages of being less susceptible to the problems of dirt in the fluid, which can sometimes block the bleed passages 46 and apertures 42. Other suitable forms of damping valve may be used besides the embodiments described above.

What is claimed is:

1. A shock absorber comprising an outer tube; an inner tube positioned inside the outer tube; a rod guide closing one end of the inner tube and the outer tube; a compensation valve assembly closing the other end of the inner tube; the other end of the outer tube being closed; a piston assembly slidably sealably positioned inside the inner tube and dividing the inner tube into a rebound chamber and a compression chamber; a piston rod connected to the piston assembly and extending through the rebound chamber and the rod guide; a compensation chamber formed between the inner tube and the outer tube; and a first damping valve covering an aperture through the inner tube from the compression chamber, the first damping valve being actuable by differential pressure above a predetermined level to allow flow of fluid in one direction only from the compression chamber through the aperture to the compensation chamber; wherein the compensation valve assembly comprises a fixed stub portion extending into the compression chamber, a bore extending through the compensation valve assembly from the compensation chamber and including a diametrically extending bore in the stub portion opening at apertures into the compression chamber; the shock absorber further comprising a second damping valve covering the apertures in the stub portion, the second damping valve allowing flow of fluid in one direction only from the compensation chamber to the compression chamber.

2. A shock absorber as claimed in claim 1, wherein each of the first and the second damping valves comprises a main body which is of flexible elastomeric material and has an annular configuration; a band of resilient material positioned internally of the main body having a first and a second circumferential edge, the main body overlying the band to define an annular flexible portion adjacent each circumferential edge; and a band spring acting on each flexible portion to bias the associated flexible portion into contact with the inner tube.

3. A shock absorber as claimed in claim 2, wherein each band has a number of inwardly directed pips to space the bands from the inner tube and the stub.

4. A shock absorber as claimed in claim 1, wherein the first damping valve comprises a resilient arm which is secured at one end to the outer surface of the inner tube, and a hemispherical ball extending from the arm at the other end, the arm biasing the ball to normally close the aperture.

* * * * *